US007233692B2

United States Patent
Li et al.

(10) Patent No.: US 7,233,692 B2
(45) Date of Patent: Jun. 19, 2007

(54) METHOD AND COMPUTER PROGRAM PRODUCT FOR IDENTIFYING OUTPUT CLASSES WITH MULTI-MODAL DISPERSION IN FEATURE SPACE AND INCORPORATING MULTI-MODAL STRUCTURE INTO A PATTERN RECOGNITION SYSTEM

(75) Inventors: David L. Li, Owego, NY (US); Elliott D. Reitz, II, Bradenton, FL (US); Dennis A. Tillotson, Glen Aubrey, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 758 days.

(21) Appl. No.: 10/294,859

(22) Filed: Nov. 14, 2002

(65) Prior Publication Data

US 2004/0096100 A1    May 20, 2004

(51) Int. Cl.
G06K 9/62    (2006.01)
(52) U.S. Cl. ...................... 382/159; 382/225
(58) Field of Classification Search ............... 382/159, 382/225
See application file for complete search history.

(56) References Cited

U.S. PATENT DOCUMENTS

| | | | |
|---|---|---|---|
| 4,481,665 A * | 11/1984 | Ota ........................... 382/102 |
| 4,551,851 A | 11/1985 | Kochert | |
| 5,077,807 A * | 12/1991 | Bokser ........................ 382/160 |
| 5,239,594 A | 8/1993 | Yoda | |
| 5,347,595 A | 9/1994 | Bokser | |
| 5,465,308 A | 11/1995 | Hutcheson et al. | |
| 5,479,570 A | 12/1995 | Imagawa et al. | |
| 5,542,006 A | 7/1996 | Shustorovich et al. | |
| 5,548,697 A | 8/1996 | Zortea | |
| 5,719,692 A | 2/1998 | Cohen | |
| 5,778,152 A | 7/1998 | Oki et al. | |
| 7,164,791 B2 * | 1/2007 | Cecala et al. ............... 382/159 |

OTHER PUBLICATIONS

Teuvo Kohonen, The Self-Organizing Map, 1990, Proceedings of the IEEE, vol. 78, No. 9, p. 1464-1480.*
U.S. Cecala et al, U.S. Appl. No. 10/208,447, filed Jul. 30, 2002 for Method and Computer Program Product for Identifying and Incorporating New Output Classes in a Pattern Recognition System During System Operation.

* cited by examiner

Primary Examiner—Joseph Mancuso
Assistant Examiner—Jonathan Schaffer
(74) Attorney, Agent, or Firm—Tarolli, Sundheim, Covell & Tummino LLP

(57) ABSTRACT

A method and computer program product are disclosed for identifying output classes with multi-modal dispersion in feature space and incorporating multi-modal structure into a pattern recognition system architecture. A plurality of input patterns, determined not to be associated with any of a set of at least one represented output class by a pattern recognition classifier, are rejected. The rejected pattern samples are grouped into clusters according to the similarities between the pattern samples. Clusters that contain samples associated with a represented output class are identified via independent review. The classifier is then retrained to recognize the identified clusters as output pseudoclasses separate from the represented output class with which they are associated. The system architecture is reorganized to incorporate the output pseudoclasses. The output pseudoclasses are rejoined to their associated class after classification.

20 Claims, 4 Drawing Sheets

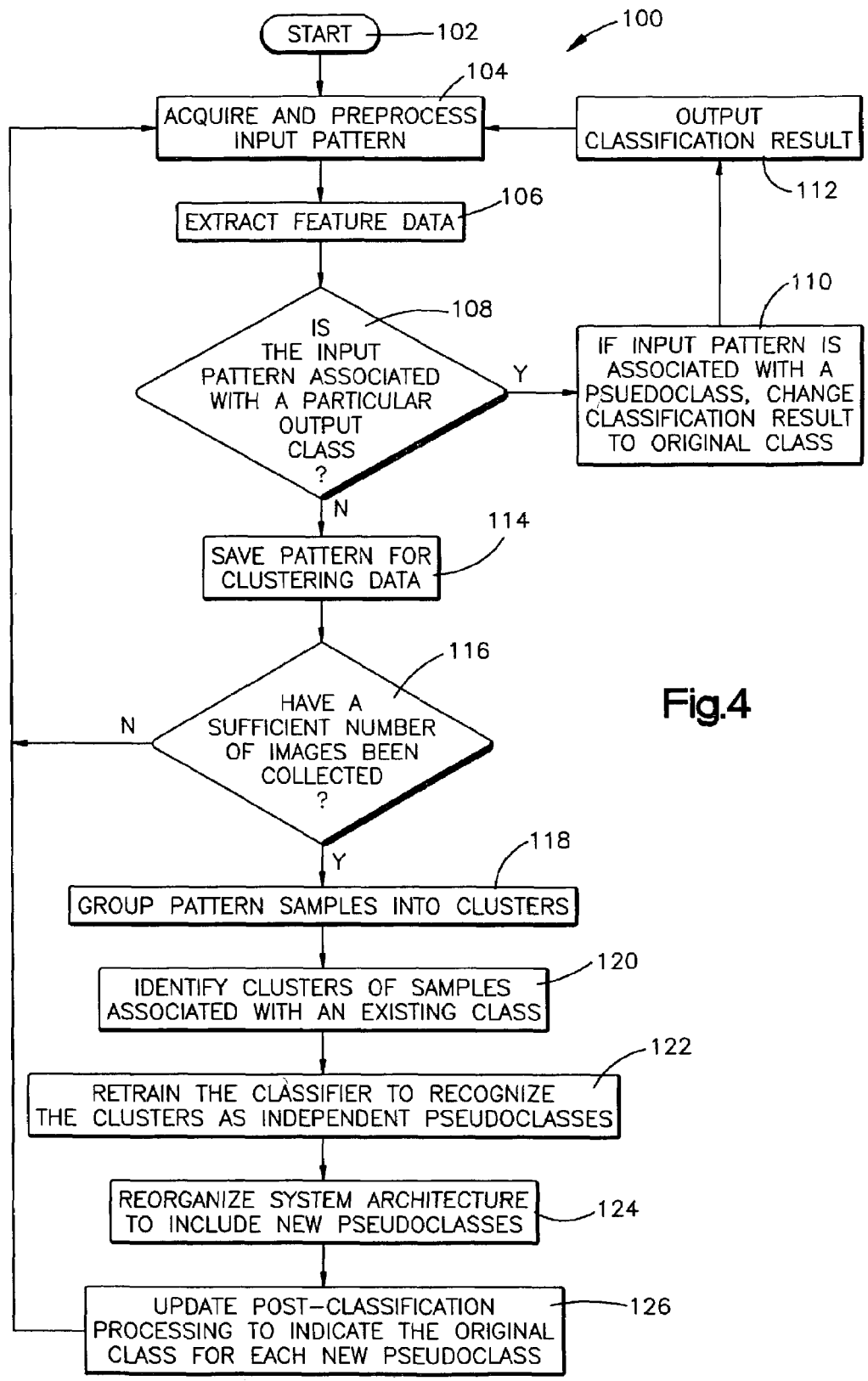

METHOD AND COMPUTER PROGRAM PRODUCT FOR IDENTIFYING OUTPUT CLASSES WITH MULTI-MODAL DISPERSION IN FEATURE SPACE AND INCORPORATING MULTI-MODAL STRUCTURE INTO A PATTERN RECOGNITION SYSTEM

BACKGROUND OF THE INVENTION

1. Technical Field

The invention relates to a method of identifying and correcting for output classes with a multi-modal distribution across feature space in a pattern recognition system. Image processing systems often contain pattern recognition devices (classifiers).

2. Description of the Prior Art

Pattern recognition systems, loosely defined, are systems capable of distinguishing between various classes of real world stimuli according to their divergent characteristics. A number of applications require pattern recognition systems, which allow a system to deal with unrefined data without significant human intervention. By way of example, a pattern recognition system may attempt to classify individual letters to reduce a handwritten document to electronic text. Alternatively, the system may classify spoken utterances to allow verbal commands to be received at a computer console. In order to classify real-world stimuli, however, it is necessary to train the classifier to discriminate between classes by exposing it to a number of sample patterns.

A typical prior art classifier is trained over a plurality of output classes using a set of training samples. The training samples are processed, data relating to features of interest are extracted, and training parameters are derived from this feature data. As the system receives an input associated with one of a plurality of classes, it analyzes its relationship to each class via a classification technique based upon these training parameters. From this analysis, the system produces an output class and an associated confidence value.

The above assumes, however, that each class has a single set of average features to which it can be compared. Some output classes are not so easily categorized. For example, while the capital letter "A" may constitute a single class in an optical character recognition system, each individual printed font will likely differ on at least some of the selected features. In some cases, this variance will be sufficient to make it impossible to distinguish the variant fonts using the original class parameters. Accordingly, it would be desirable to identify situations where samples within a single class have multiple sets of varying characteristics and account for this multimodal distribution in the classification analysis.

SUMMARY OF THE INVENTION

In accordance with one aspect of the present invention, a method, operative within a pattern recognition system with a plurality of represented output classes, is disclosed for identifying output classes with multi-modal dispersion in feature space and incorporating multi-modal structure into a system architecture.

A plurality of input patterns, determined not to be associated with any of a set of at least one represented output class by a pattern recognition classifier, are rejected. The rejected pattern samples are grouped into clusters according to the similarities between the pattern samples. Clusters that contain samples associated with a represented output class are identified via independent review.

The classifier is then retrained to recognize the identified clusters as output pseudoclasses separate from the represented output class with which they are associated. The system architecture is reorganized to incorporate the output pseudoclasses. The output pseudoclasses are rejoined to their associated class after classification.

In accordance with another aspect of the present invention, a computer program product is disclosed for use in a pattern recognition system with a plurality of represented output classes for identifying output classes with multi-modal dispersion in feature space and incorporating multi-modal structure into a system architecture.

A classification portion rejects a plurality of input patterns determined not to be associated with any of a set of at least one represented output class by a pattern recognition classifier. A clustering portion groups the rejected pattern samples into clusters according to the similarities between the pattern samples. An identification portion identifies clusters that contain samples associated with a represented output class via independent review.

A training portion retrains the classifier to recognize the identified clusters as output pseudoclasses separate from the represented output class with which they are associated. A reorganization portion then reorganizes the system architecture to incorporate the output pseudoclasses. A post-processing portion rejoins the output pseudoclasses to their associated class after classification.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 4 is a flow diagram illustrating the run-time operation of the present invention;

DETAILED DESCRIPTION OF THE INVENTION

In accordance with the present invention, a method for identifying output classes with multi-modal dispersion in feature space and incorporating multi-modal structure into a system architecture is described. The method may be applied to classifiers used in any traditional pattern recognition classifier task, including, for example, optical character recognition (OCR), speech translation, and image analysis in medical, military, and industrial applications.

It should be noted that a pattern recognition classifier to which the present invention may be applied will typically be implemented as a computer program, preferably a program simulating, at least in part, the functioning of a neural network. Accordingly, an understanding of the present invention will be facilitated by an understanding of the operation and structure of a neural network.

Figure 1:
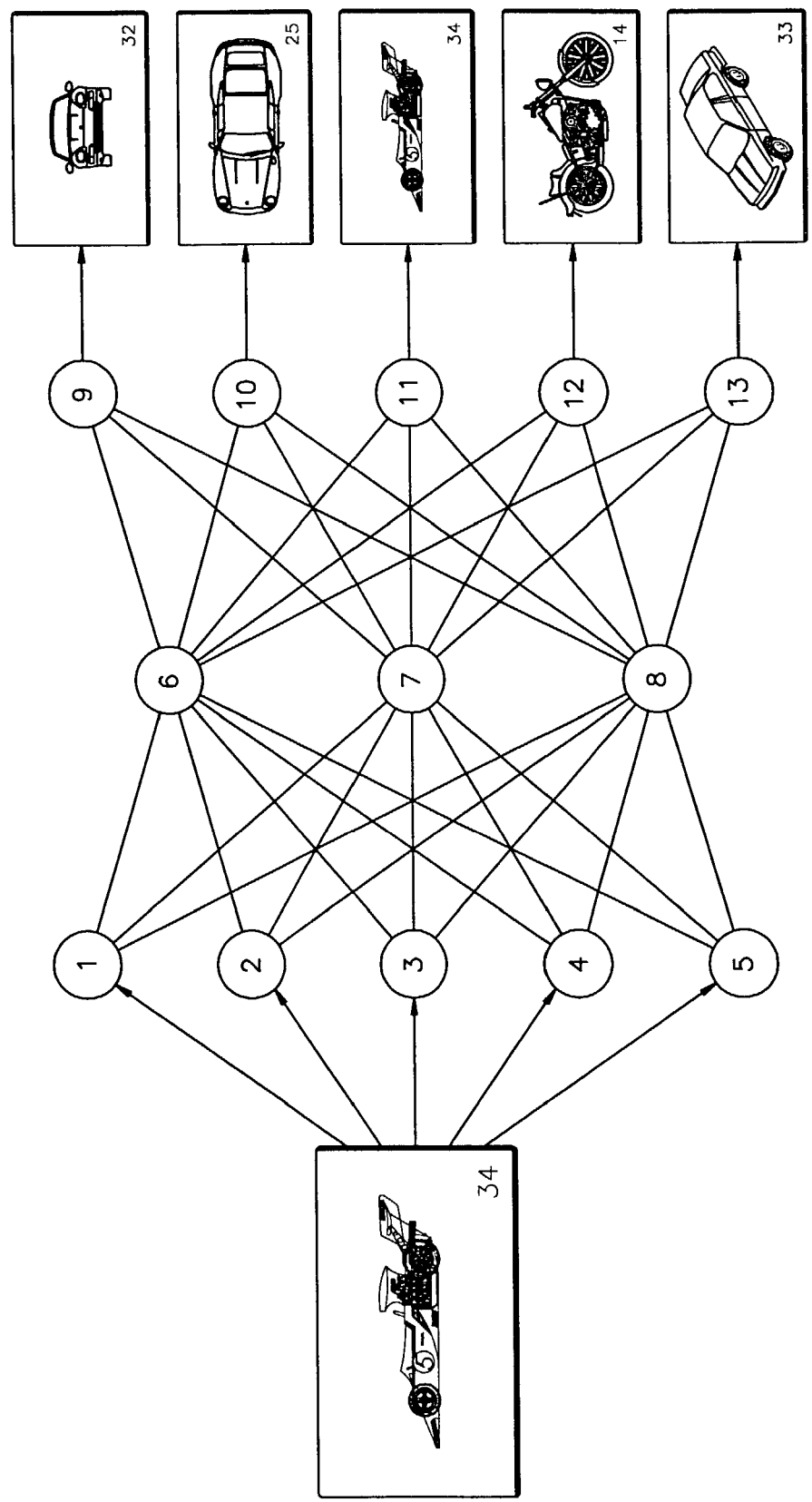
FIG. 1 is an illustration of an exemplary neural network utilized for pattern recognition.

FIG. 1 illustrates a neural network that might be used in a pattern recognition task. The illustrated neural network is a three-layer back-propagation neural network used in a pattern classification system. It should be noted here, that the neural network illustrated in FIG. 1 is a simple example solely for the purposes of illustration. Any non-trivial application involving a neural network, including pattern classification, would require a network with many more nodes in each layer. Likewise, additional hidden layers might be required.

In the illustrated example, an input layer comprises five input nodes, 1–5. A node, generally speaking, is a processing unit of a neural network. A node may receive multiple inputs from prior layers which it processes according to an internal formula. The output of this processing may be provided to multiple other nodes in subsequent layers. The functioning of nodes within a neural network is designed to mimic the function of neurons within a human brain.

Each of the five input nodes 1–5 receives input signals with values relating to features of an input pattern. By way of example, the signal values could relate to the portion of an image within a particular range of grayscale brightness. Alternatively, the signal values could relate to the average frequency of an audio signal over a particular segment of a recording. Preferably, a large number of input nodes will be used, receiving signal values derived from a variety of pattern features.

Each input node sends a signal to each of three intermediate nodes 6–8 in the hidden layer. The value represented by each signal will be based upon the value of the signal received at the input node. It will be appreciated, of course, that in practice, a classification neural network may have a number of hidden layers, depending on the nature of the classification task.

Each connection between nodes of different layers is characterized by an individual weight. These weights are established during the training of the neural network. The value of the signal provided to the hidden layer by the input nodes is derived by multiplying the value of the original input signal at the input node by the weight of the connection between the input node and the intermediate node. Thus, each intermediate node receives a signal from each of the input nodes, but due to the individualized weight of each connection, each intermediate node receives a signal of different value from each input node. For example, assume that the input signal at node 1 is of a value of 5 and the weights of the connections between node 1 and nodes 6–8 are 0.6, 0.2, and 0.4 respectively. The signals passed from node 1 to the intermediate nodes 6–8 will have values of 3, 1, and 2.

Each intermediate node 6–8 sums the weighted input signals it receives. This input sum may include a constant bias input at each node. The sum of the inputs is provided into a transfer function within the node to compute an output. A number of transfer functions can be used within a neural network of this type. By way of example, a threshold function may be used, where the node outputs a constant value when the summed inputs exceed a predetermined threshold. Alternatively, a linear or sigmoidal function may be used, passing the summed input signals or a sigmoidal transform of the value of the input sum to the nodes of the next layer.

Regardless of the transfer function used, the intermediate nodes 6–8 pass a signal with the computed output value to each of the nodes 9–13 of the output layer. An individual intermediate node (i.e. 7) will send the same output signal to each of the output nodes 9–13, but like the input values described above, the output signal value will be weighted differently at each individual connection. The weighted output signals from the intermediate nodes are summed to produce an output signal. Again, this sum may include a constant bias input.

Each output node represents an output class of the classifier. The value of the output signal produced at each output node represents the probability that a given input sample belongs to the associated class. In the example system, the class with the highest associated probability is selected, so long as the probability exceeds a predetermined threshold value. The value represented by the output signal is retained as a confidence value of the classification.

Figure 2:
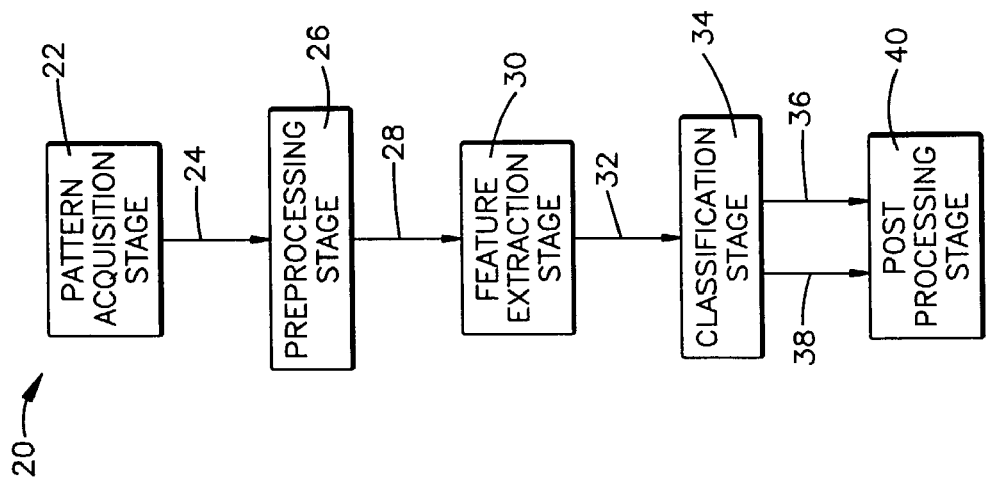
FIG. 2 is a functional diagram of a classifier compatible with the present invention.

FIG. 2 illustrates a classification system 20 that might be used in association with the present invention. As stated above, the present invention and any associated classification system will likely be implemented as software programs. Therefore, the structures described hereinafter may be considered to refer to individual modules and tasks within these programs.

Focusing on the function of a classification system 20 compatible with the present invention, the classification process begins at a pattern acquisition stage 22 with the acquisition of an input pattern. The pattern 24 is then sent to a preprocessing stage 26, where the pattern 24 is preprocessed to enhance the image, locate portions of interest, eliminate obvious noise, and otherwise prepare the pattern for further processing.

The selected portions of the pattern 28 are then sent to a feature extraction stage 30. Feature extraction converts the pattern 28 into a vector 32 of numerical measurements, referred to as feature variables. Thus, the feature vector 32 represents the pattern 28 in a compact form. The vector 32 is formed from a sequence of measurements performed on the pattern. Many feature types exist and are selected based on the characteristics of the recognition problem.

The extracted feature vector 32 is then provided to a classification stage 34. The classification stage 34 relates the feature vector 32 to the most likely output class, and determines a confidence value 36 that the pattern is a member of the selected class. This is accomplished by a statistical or neural network classifier. Mathematical classification techniques convert the feature vector input to a recognition result 38 and an associated confidence value 36. The confidence value 36 provides an external ability to assess the correctness of the classification. For example, a classifier output may have a value between zero and one, with one representing maximum certainty.

Figure 3:
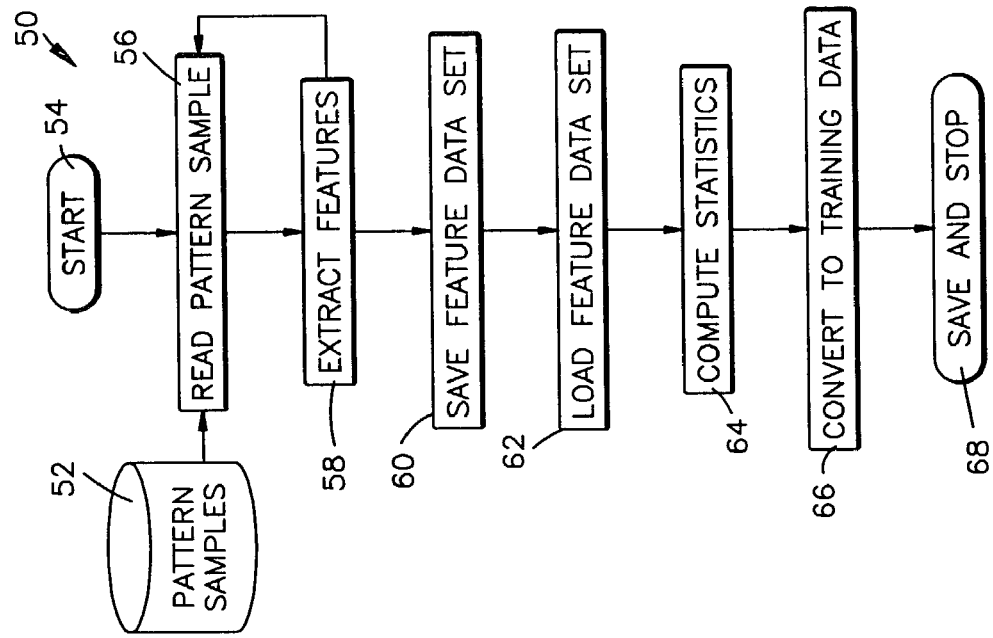
FIG. 3 is a flow diagram illustrating the training of a classifier compatible with the present invention.

FIG. 3 is a flow diagram illustrating the operation of a computer program 50 used to train a pattern recognition classifier via computer software. A number of pattern samples 52 are collected or generated. The number of pattern samples necessary for training varies with the application. The number of output classes, the selected features, and the nature of the classification technique used directly affect the number of samples needed for good results for a particular classification system. While the use of too few images can result in an improperly trained classifier, the use of too many samples can be equally problematic, as it can take too long to process the training data without a significant gain in performance.

The actual training process begins at step 54 and proceeds to step 56. At step 56, the program retrieves a pattern sample from memory. The process then proceeds to step 58, where the pattern sample is converted into a feature vector input similar to those a classifier would see in normal run-time operation. After each sample feature vector is extracted, the results are stored in memory, and the process returns to step

56. After all of the samples are analyzed, the process proceeds to step 60, where the feature vectors are saved to memory as a set.

The actual computation of the training data begins in step 62, where the saved feature vector set is loaded from memory. After retrieving the feature vector set, the process progresses to step 64. At step 64, the program calculates statistics, such as the mean and standard deviation of the feature variables for each class. Intervariable statistics may also be calculated, including a covariance matrix of the sample set for each class. The process then advances to step 66 where it uses the set of feature vectors to compute the training data. At this step in an example embodiment, an inverse covariance matrix is calculated, as well as any fixed value terms needed for the classification process. After these calculations are performed, the process proceeds to step 68 where the training parameters are stored in memory and the training process ends.

FIG. 4 is a flow diagram illustrating the present invention in the context of a pattern recognition system representing at least one output class. The process 100 begins at step 102 and proceeds to step 104, where an input pattern sample is acquired and preprocessed. During preprocessing, the pattern sample is enhanced, portions of interest are located, and obvious noise is eliminated. Other alterations to the input pattern sample may be made to prepare the pattern sample for further processing.

The process then proceeds to step 106, where feature data is extracted from the pattern sample. Feature extraction converts the pattern into a vector of numerical measurements, referred to as feature variables. Thus, the feature vector represents the pattern in a compact form. The vector is formed from a sequence of measurements performed on the pattern. Many feature types exist and are selected based on the characteristics of the recognition problem.

The process then advances to step 108, where the system determines if the input pattern sample is associated with an output class represented by the system. This determination will vary depending on the classification technique used. If the system determines that the input pattern sample is associated with a represented output class, the process proceeds to step 110. At step 110, the system associates any pattern samples identified as part of a pseudoclass with its proper class. Thus, the classification result associated with the pattern is changed from the pseudoclass to the appropriate class. The process then progresses to step 112, where the classification result is outputted. The process then returns to step 104 to process another input pattern sample.

If the input pattern sample is rejected (i.e. not determined to be associated with a particular class), the process advances to step 114, where the pattern sample is stored in memory. The process then advances to step 116, where the system determines if a sufficient number of pattern samples have been collected to conduct a clustering analysis. The necessary number will vary, depending upon the type of analysis used. If an insufficient number of pattern samples have been collected, the system returns to step 104 to process another pattern.

If a sufficient number of pattern samples have been collected, the process proceeds to step 118, where the collected pattern samples are grouped into clusters according to their proximity in feature space. In other words, pattern samples possessing similar features are grouped together, according to a clustering algorithm. A number of clustering algorithms exist for use in this application, including k-means algorithms, gradient search techniques, and similar optimization techniques. In the example embodiment, a type of genetic clustering algorithm is used to group the pattern samples. A number of genetic clustering algorithms are known in the art.

The process then advances to step 120, where the clusters are subjected to independent review to identify clusters of pattern samples that are associated with a represented output class. The identified clusters will represent secondary distributions of existing output classes, rejected by the classifier because they did not match the dominant feature model for the class within the classification process. In a preferred embodiment, the clustered pattern data is outputted to a human operator for review. Alternatively, the clustering may be verified by a computerized process, such as an alternate clustering algorithm.

The process then proceeds to step 122, where the clustered pattern samples are used to retrain the classifier to recognize the distributions represented by the clusters as independent classes. Since these classes are not actually independent, but are instead associated with an existing output class, they will be referred to hereinafter as pseudoclasses. This allows the classifier to identify pattern samples falling within the secondary distributions of a multi-modal output class.

The process continues at step 124, where the system reorganizes the classification architecture to maintain its efficiency with the addition of the new pseudoclasses. A clustering analysis is performed on a set of vectors consisting of the mean feature vector for each class and pseudoclass to identify clusters of classes that are poorly separated in feature space. A number of clustering algorithms are available for this purpose, including Ward's method, k-means analysis, and iterative optimization methods.

After the clustering analysis, the system establishes the identified clusters as a classification level. A level of classification discriminates between the identified clusters using a selected set of features. The system then determines if any of the clusters contain multiple output classes. If one or more clusters with multiple output classes are found, the classes within these clusters are poorly separated in feature space, and it is necessary to arrange the output classes within the clusters into at least one additional sublevel. The clustering analysis will be repeated, using a different set of features, within each cluster containing multiple classes until every class is separated at some level of the architecture. At this point, the generated classification architecture is accepted by the system.

The process continues at step 126, where the system rejoins the pseudoclass pattern sample sets to the associated original class. After discovery of a new pseudoclass and reorganization of the classifier, the system alters the post-classification processing to associate the new pseudoclass with its original class. Consequently, patterns classified as members of a pseudoclass during run-time operation are associated with the original class during post-processing.

Figure 5:
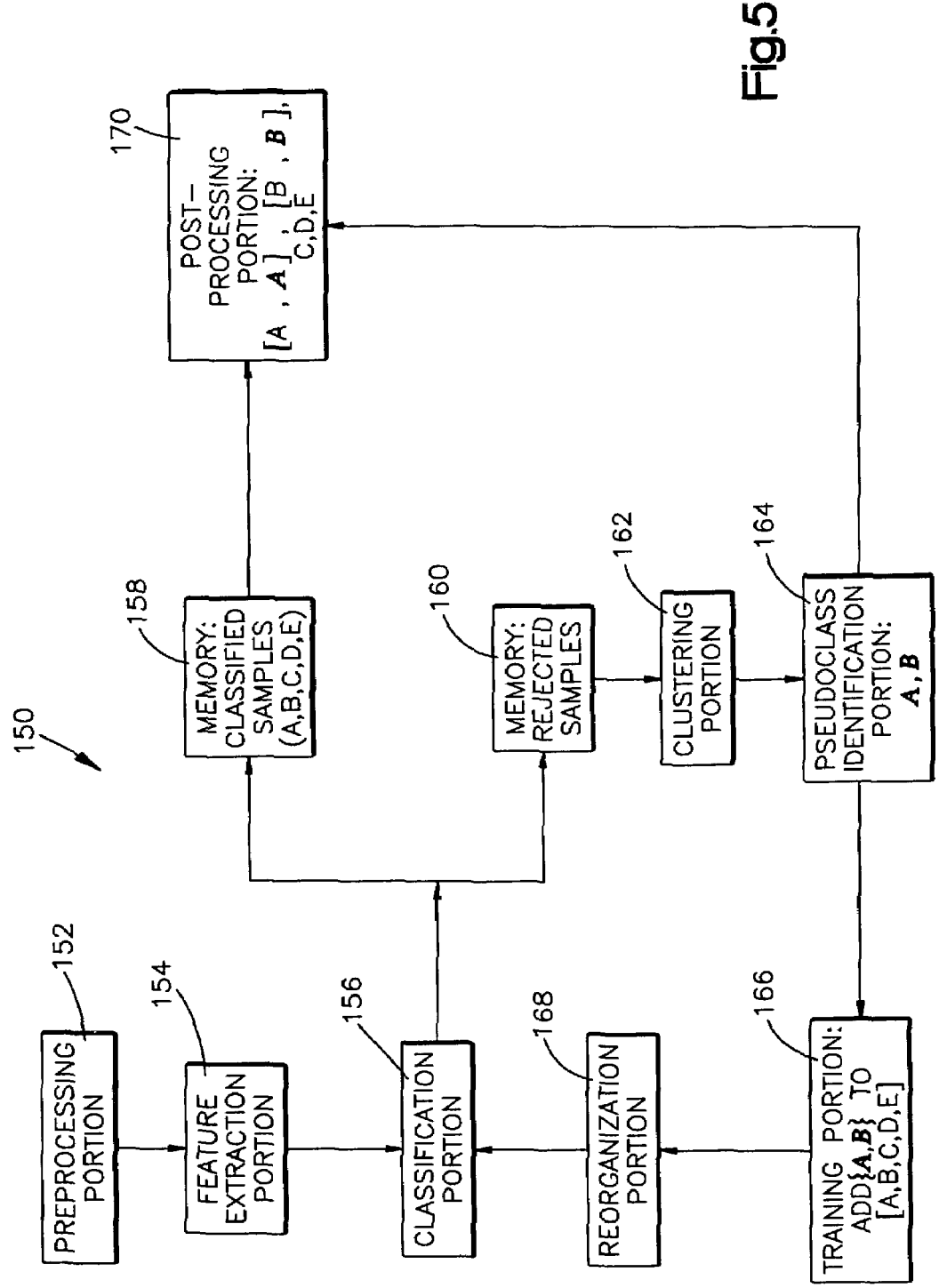
FIG. 5 is a schematic diagram of an example embodiment of the present invention in the context of a postal indicia recognition system.

FIG. 5 illustrates an example embodiment of a postal indicia recognition system 150 incorporating the present invention. At the preprocessing portion 152, an input image is obtained and extraneous portions of the image are eliminated. In the example embodiment, the system locates any potential postal indicia within the envelope image. The image is segmented to isolate the postal indicia into separate images and extraneous portions of the segmented images are cropped. Any rotation of the images is corrected to a standard orientation. The preprocessing portion 152 then creates an image representation of reduced size to facilitate feature extraction.

The preprocessed image segment is then passed to a feature extraction portion 154. The feature extraction portion 154 analyzes preselected features of the image. The selected features can be literally any values derived from the image that vary sufficiently among the various output classes to serve as a basis for discriminating among them. Numerical data extracted from the features can be conceived for computational purposes as a feature vector, with each element of the vector representing a value derived from one feature within the image. Features can be selected by any reasonable method, but typically, appropriate features will be selected by experimentation. Generally, the features are selected at the time a classification architecture is established. In the preferred embodiment of a postal indicia recognition system, example features include a histogram variable set containing sixteen histogram feature values, and a downscaled feature set, containing sixteen "Scaled 16" feature values.

A scanned grayscale image consists of a number of individual pixels, each possessing an individual level of brightness, or grayscale value. The histogram feature variables focus on the grayscale value of the individual pixels within the image. Each of the sixteen histogram variables represents a range of grayscale values. The values for the histogram feature variables are derived from a count of the number of pixels within the image having a grayscale value within each range. By way of example, the first histogram feature variable might represent the number of pixels falling within the lightest sixteenth of the range all possible grayscale values.

The "Scaled 16" variables represent the average grayscale values of the pixels within sixteen preselected areas of the image. By way of example, the sixteen areas may be defined by a four by four equally spaced grid superimposed across the image. Thus, the first variable would represent the average or summed value of the pixels within the upper left region of the grid.

The extracted feature vector is then inputted into a classification portion 156. At the classification portion, the feature vector is compared to training data from a number of output classes. A variety of classifier architectures and techniques may be selected for making this determination. In the example embodiment, the classification portion 156 makes use of a Bayesian Mahalanobis distance classification system.

The classification portion attempts to match the input feature vector to one of a plurality of represented classes using the selected classification technique. In this process, a class will be selected and a corresponding confidence measurement will be calculated. If the confidence measurement is above a predetermined threshold, the feature vector is classified as the corresponding class and stored in a classified sample memory 158 as a member of that class. If the confidence measurement does not exceed the threshold, the feature vectors are stored in a rejected sample memory 160 for later analysis.

Once a sufficient number of image samples have been accumulated, the image samples are passed to a clustering portion 162. The clustering portion 162 groups the image samples into clusters based upon similarities in their features. More precisely, the clustering portion 162 groups together those images whose feature vectors are relatively close to one another within an N-dimensional space, where each of the N dimensions represents a feature variable. A number of clustering algorithms exist for this purpose, including, for example, nearest neighbor clustering, gradient trace techniques, and k-means clustering. In the example embodiment, a type of genetic clustering algorithm is applied to group the rejected samples. After the clusters are identified, the newly classified image samples are passed to a pseudoclass identification portion 164.

At the pseudoclass identification portion 164, the clusters are subjected to independent review to determine if any clusters of samples that are associated with a represented output class. Samples that represent a secondary grouping of established classes are identified as pseudoclasses. Identification of pseudoclasses can be accomplished by a number of methods, ranging from computerized review, such as review by a customized clustering algorithm, to identification of the new classes by a human operator. In the preferred embodiment, a human operator reviews the clustered samples to determine if any clusters warrant treatment as a pseudoclass. If such clusters are found, the identified pseudoclasses are passed to a training portion 166.

The training portion 166 retrains the classifier to accept the pseudoclasses as output classes. In essence, the training portion 166 uses the image samples identified as part of each new pseudoclass, and uses them to train the classifier to accept the pseudoclasses as output classes. Training data for each of the various pseudoclasses is derived at this point, such as the mean, variance, and range of each feature over the pseudoclass. After the classifier is retrained to accept the pseudoclasses, the training data for the original classes and the psuedoclasses are passed to a reorganization portion 168.

The reorganization portion 168 reorganizes the classification architecture of the system to incorporate the new pseudoclasses. In the reorganization portion 168, the extracted data is analyzed to determine if the output classes and pseudoclasses are well-separated in feature space. The clustering analysis can take place via any number of methods, depending on the number of levels of classification expected or desired, the time necessary for classification at each iteration, and the number of output classes represented in the analysis.

In the example embodiment, a Kohonen algorithm is applied to group the classes. Each of the output classes, including the new pseudoclasses, is represented by a vector containing as its elements the mean feature value for that class for each of the features used by the classifier. The clustering analysis begins with a distance determination among all of these class representative vectors in a training set.

In the Kohonen algorithm, a map is formed with a number of discrete units. Associated with each unit is a weight vector, initially consisting of random values. Each of the class representative vectors is inputted into the Kohonen map as a training vector. Units respond to the input vector according to the correlation between the input vector and the unit's weight vector. The unit with the highest response to the input is allowed to learn by changing its weight vector in accordance with the input, as are some other clusters in the neighborhood of the clusters. The neighborhood decreases in size during the training period.

The result of the training is that a pattern of organization emerges among the units. Different units learn to respond to different vectors in the input set, and units closer together will tend to respond to input vectors that resemble each other. When the training is finished, the set of class representative vectors is applied to the map once more, marking for each class the unit that responds the strongest (is most similar) to that input vector. Thus, each class becomes associated with a particular unit on the map, creating natural clusters of classes.

These natural clusters may be further grouped by combining map units that represent similar output classes. In an example embodiment, this is accomplished by a genetic clustering algorithm. Once the Kohonen clustering is established, it can be altered slightly, by combining or separating map units. For each clustering state, a metric is calculated to determine the utility of the clustering. This allows the system to select which clustering state is optimal for the selected application. Often, this metric is a function of the within groups variance of the clusters, such as the Fisher Discriminant Ratio. Such metrics are well known in the art.

In the example embodiment, the clustering portion 162 includes of a number of single class classification portions, each representing one of the output classes or pseudoclasses of interest. Each of these classifiers receives a number of known image samples to classify. Each classifier is assigned a cost function based upon the accuracy of its classification of the samples, and the time necessary to classify the samples. The cluster arrangement that produces the minimum value for this cost function is selected as the clustering state for the analysis.

The architecture reorganization portion 168 then arranges the system architecture in accordance with the results of the clustering analysis. The various clusters of classes are arranged into a first level of classification. A number of classifiers are available for use at each level, and different classifiers may be used in different sublevels of classification. In the example embodiment, a technique based on radial basis function networks is used for the various classification stages. Classification techniques based on radial basis functions are well known in the art.

For clusters found to contain more than one class, a sublevel of processing is created to aid the classification process. The reorganization process is repeated for each new sublevel, each of which can utilize different features and classification techniques.

The post-processing portion 170 applies the relationships between classes and pseudoclasses determined during the pseudoclass identification portion 164 to rejoin the image sets from the original class and the pseudoclass. The post-processing portion 170 is updated with the discovery of a new pseudoclass to allow images identified as part of a pseudoclass to be rejoined to their proper class. During post-processing, image samples identified as members of the various pseudoclasses are recognized as members of their associated class. Accordingly, upon receiving image identified as a member of the pseudoclass during run-time operation, the post-processing portion associates the class with the original class and outputs the proper class association.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A method, operative within a pattern recognition system with a plurality of represented output classes, for identifying output classes with multi-modal dispersion in feature space and incorporating multi-modal structure into a system architecture, said method comprising:

providing a plurality of input patterns having no known class affiliation to the pattern recognition classifier;

rejecting a subset of the plurality of input pattern samples that are determined not to be associated with any of a plurality of represented output classes by a pattern recognition classifier;

grouping the rejected pattern samples into clusters according to their proximity in a feature space associated with the pattern recognition classifier;

identifying clusters that contain pattern samples associated with a represented output class via independent review;

retraining the classifier to recognize the identified clusters as output pseudoclasses separate from the represented output class with which they are associated;

reorganizing the system architecture to incorporate the output pseudoclasses; and rejoining the output pseudoclasses to their associated classes after classification.

2. A method as set forth in claim 1, wherein the step of reorganizing the system architecture includes applying a Kohonen clustering algorithm.

3. A method as set forth in claim 1, wherein the step of reorganizing the system architecture includes minimizing a cost function associated with a pattern recognition classifier as part of a clustering algorithm.

4. A method as set forth in claim 1, wherein the step of reorganizing the system architecture includes minimizing a function of the within group variance of the plurality of clusters as part of a clustering algorithm.

5. A method as set forth in claim 1, wherein the step of identifying clusters associated with a represented output class via independent review includes subjecting the clustered pattern samples to a computerized verification process.

6. A method as set forth in claim 1, wherein the step of identifying clusters associated with a represented output class via independent review includes outputting the clusters of rejected pattern samples to a human operator.

7. A method as set forth in claim 1, wherein the plurality of input patterns includes scanned images.

8. A method as set forth in claim 7, wherein at least one of the plurality of represented output classes represents a variety of postal indicia.

9. A method as set forth in claim 7, wherein at least one of the plurality of represented output classes represents an alphanumeric character.

10. A computer program product, operative within a data processing system and implemented on a computer readable medium, for use in a pattern recognition system with a plurality of represented output classes for identifying output classes with multi-modal dispersion in feature space and incorporating multi-modal structure into a system architecture, said method comprising:

a classification portion that receives a plurality of input patterns having no known class affiliation and rejects a subset of the plurality of input pattern samples that are determined not to be associated with any of a plurality of represented output classes by a pattern recognition classifier;

a clustering portion that groups the rejected pattern samples into clusters according to their proximity in a feature space associated with the pattern recognition classifier;

an identification portion that identifies clusters that contain samples associated with a represented output class via independent review;

a training portion that retrains the classifier to recognize the identified clusters as output pseudoclasses separate from the represented output class with which they are associated;

a reorganization portion that reorganizes the system architecture to incorporate the output pseudoclasses; and a post-processing portion that rejoins the output pseudoclasses to their associated class after classification.

11. A computer program product as set forth in claim 10, wherein the reorganization portion applies a Kohonen clustering algorithm in determining an optimal system architecture.

12. A computer program product as set forth in claim 10, wherein the reorganization portion determines an optimal system architecture by minimizing a cost function associated with a pattern recognition classifier as part of a clustering algorithm.

13. A computer program product as set forth in claim 10, wherein the reorganization portion determines an optimal clustering by minimizing a function of the within group variance of the plurality of clusters as part of a clustering algorithm.

14. A computer program product as set forth in claim 10, wherein the identification portion subjects the clusters of samples to a computerized verification process for independent review.

15. A computer program product as set forth in claim 10, wherein the identification portion outputs the clusters of samples to a human operator for independent review.

16. A computer program product as set forth in claim 10, wherein the input patterns include scanned images.

17. A computer program product as set forth in claim 16, wherein at least one of the represented output classes represents a variety of postal indicia.

18. A computer program product as set forth in claim 16, wherein at least one of the represented output classes represents an alphanumeric character.

19. A method for identifying new pattern classes and incorporating the classes into a pattern recognition classifier as output classes:

classifying a plurality of input patterns at the pattern recognition classifier such that each of the plurality of input patterns is assigned to one of an output class from a plurality of output classes associated with the pattern recognition classifier and set of rejected input patterns;

executing a clustering algorithm to assign the set of rejected input patterns to at least one cluster according to their proximity in a multidimensional feature space associated with the pattern recognition classifier;

identifying at least one cluster of rejected samples representing an output class associated with the pattern recognition classifier from the at least one cluster produced by the clustering algorithm;

retraining the classifier to recognize the identified clusters as output pseudoclasses separate from the represented output class with which they are associated;

reorganizing the system architecture to incorporate the output pseudoclasses; and rejoining the output pseudoclasses to their associated classes after classification.

20. The method of claim 19, further comprising:

determining if the set of rejected input patterns is sufficiently large to perform a clustering algorithm; and executing the clustering algorithm if the set of rejected input patterns is sufficiently large.

* * * * *

UNITED STATES PATENT AND TRADEMARK OFFICE
CERTIFICATE OF CORRECTION

| | | |
|---|---|---|
| PATENT NO. | : 7,233,692 B2 | Page 1 of 1 |
| APPLICATION NO. | : 10/294859 | |
| DATED | : June 19, 2007 | |
| INVENTOR(S) | : David L. Ii et al. | |

It is certified that error appears in the above-identified patent and that said Letters Patent is hereby corrected as shown below:

Title Page, (12), after "United States Patent" delete "Li" and insert -- Ii--.

Title Page, (75), after "David L." delete "Li" and insert -- Ii--.

Signed and Sealed this

Thirteenth Day of November, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,233,692 B2 | Page 1 of 1 |
| APPLICATION NO. | : 10/294859 | |
| DATED | : June 19, 2007 | |
| INVENTOR(S) | : David L. li et al. | |

It is certified that error appears in the above-identified patent and that said Letters Patent is hereby corrected as shown below:

Title Page, (12), after "United States Patent" delete "Li" and insert -- li--.

Title Page, (75), after "David L." delete "Li" insert --li--

Signed and Sealed this

Twenty-seventh Day of November, 2007

JON W. DUDAS
*Director of the United States Patent and Trademark Office*